(12) United States Patent
Niessner et al.

(10) Patent No.: US 10,886,710 B2
(45) Date of Patent: Jan. 5, 2021

(54) PRE-CHAMBER SPARK PLUG FOR HIGHLY STRESSED MOBILE GASOLINE-DRIVEN ENGINE APPLICATIONS

(71) Applicant: Federal-Mogul Ignition GmbH, Neuhaus-Schierschnitz (DE)

(72) Inventors: Werner Niessner, Steinheim (DE); Matthias Blankmeister, Heiligenhaus (DE)

(73) Assignee: FEDERAL-MOGUL IGNITION GMBH, Neuhaus-Schierschni (DE)

( * ) Notice: Subject to any disclaimer, the term of this patent is extended or adjusted under 35 U.S.C. 154(b) by 169 days.

(21) Appl. No.: 15/926,559

(22) Filed: Mar. 20, 2018

(65) Prior Publication Data

US 2018/0294626 A1  Oct. 11, 2018

(30) Foreign Application Priority Data

Apr. 10, 2017  (DE) .................. 10 2017 107 679

(51) Int. Cl.
*H01T 13/54* (2006.01)
*F02B 19/10* (2006.01)
(Continued)

(52) U.S. Cl.
CPC .......... *H01T 13/54* (2013.01); *F02B 19/1004* (2013.01); *F02B 19/12* (2013.01);
(Continued)

(58) Field of Classification Search
CPC ................................ F02B 19/12; H01T 13/32
See application file for complete search history.

(56) References Cited

U.S. PATENT DOCUMENTS 2,292,974 A   8/1942  Smithells
2,640,474 A   6/1953  Phillips
(Continued)

FOREIGN PATENT DOCUMENTS

CA        572678 A    3/1959
DE       3148296 A1   9/1982
(Continued)

OTHER PUBLICATIONS

Office action issued by the German Patent and Trademark Office for application No. DE 102017107 679.4 dated Jan. 31, 2019.
(Continued)

*Primary Examiner* — Joseph L Williams
*Assistant Examiner* — Jacob R Stern
(74) *Attorney, Agent, or Firm* — Reising Ethington, P.C.

(57) ABSTRACT

A pre-chamber spark plug for an internal combustion engine having: a body with a passage in which an insulator is fastened and a center electrode protrudes; at least one ground electrode extending in a straight line forms a spark gap with the center electrode; a pre-chamber-forming cap which delimits a pre-chamber and shields the center and ground electrodes from a combustion chamber after the spark plug has been installed in the engine, wherein the cap has at least one opening which permits a gas exchange between the pre-chamber and the space outside the pre-chamber. The ground electrode includes a reinforcing component welded to an end surface of a supporting component, and the supporting component is either welded to an end surface of the body or is welded to a step that is formed on the end surface.

12 Claims, 3 Drawing Sheets

Figure 1:
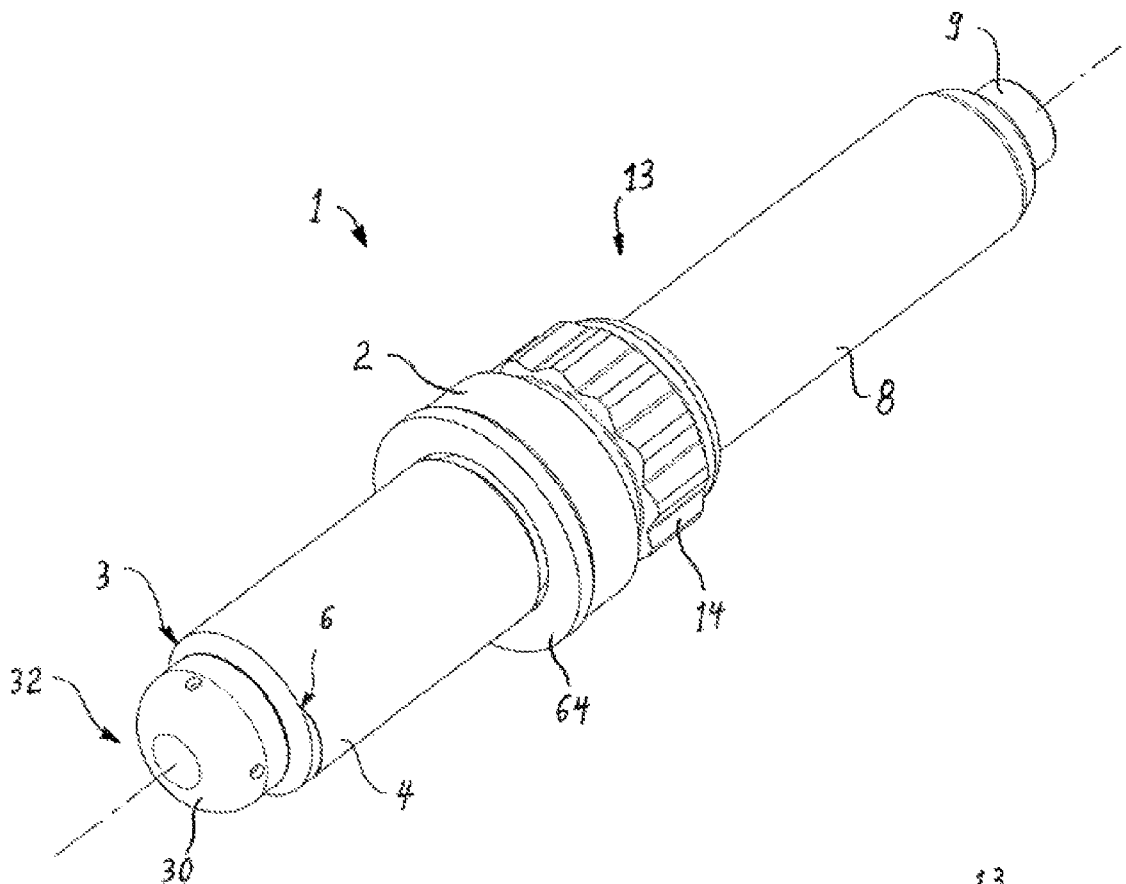

(51) Int. Cl.
*H01T 13/32* (2006.01)
*H01T 13/46* (2006.01)
*F02B 19/12* (2006.01)

(52) U.S. Cl.
CPC ............ *H01T 13/32* (2013.01); *H01T 13/46* (2013.01); *H01T 13/467* (2013.01); *Y02T 10/12* (2013.01)

(56) References Cited

U.S. PATENT DOCUMENTS

| | | | |
|---|---|---|---|
| 2,652,043 | A | 9/1953 | Johnson |
| 2,652,044 | A | 9/1953 | Phillips |
| 4,319,552 | A | 3/1982 | Sauer |
| 5,189,333 | A * | 2/1993 | Kagawa ............... H01T 13/467 313/140 |
| 7,922,551 | B2 | 4/2011 | Tozzi |
| 8,350,457 | B2 | 1/2013 | Thomas et al. |
| 8,461,750 | B2 | 6/2013 | Tozzi |
| 8,657,641 | B2 | 2/2014 | Burke |
| 8,810,117 | B2 | 8/2014 | Fuchs et al. |
| 8,912,716 | B2 | 12/2014 | Hwang et al. |
| 9,093,823 | B2 | 7/2015 | Sakakura et al. |
| 9,500,118 | B2 | 11/2016 | Tozzi et al. |
| 9,843,166 | B2 | 12/2017 | Okazaki et al. |
| 2011/0065350 | A1 * | 3/2011 | Burke ..................... H01T 13/54 445/46 |
| 2014/0060479 | A1 | 3/2014 | Tozzi et al. |
| 2014/0102404 | A1 * | 4/2014 | Sotiropoulou ...... F02B 19/1014 123/260 |
| 2014/0261296 | A1 | 9/2014 | Sotiropoulou et al. |
| 2016/0053671 | A1 | 2/2016 | Sotiropoulou et al. |
| 2017/0005457 | A1 | 1/2017 | Niessner |

FOREIGN PATENT DOCUMENTS

| | | |
|---|---|---|
| DE | 3305416 A1 | 8/1984 |
| DE | 10144976 A1 | 4/2003 |
| DE | 102006000070 A1 | 9/2006 |
| DE | 102012022872 A1 | 5/2014 |
| DE | 102014015707 A1 | 12/2015 |
| DE | 102014013513 A1 | 3/2016 |
| DE | 102015110601 B3 | 1/2017 |
| JP | 2008186667 A | 8/2008 |
| JP | 5647588 B2 | 1/2015 |
| JP | 2015190337 A | 11/2015 |
| WO | 2012159756 A1 | 11/2012 |

OTHER PUBLICATIONS

Office action issued by the German Patent and Trademark Office for application No. DE 102017107 679.4.

* cited by examiner

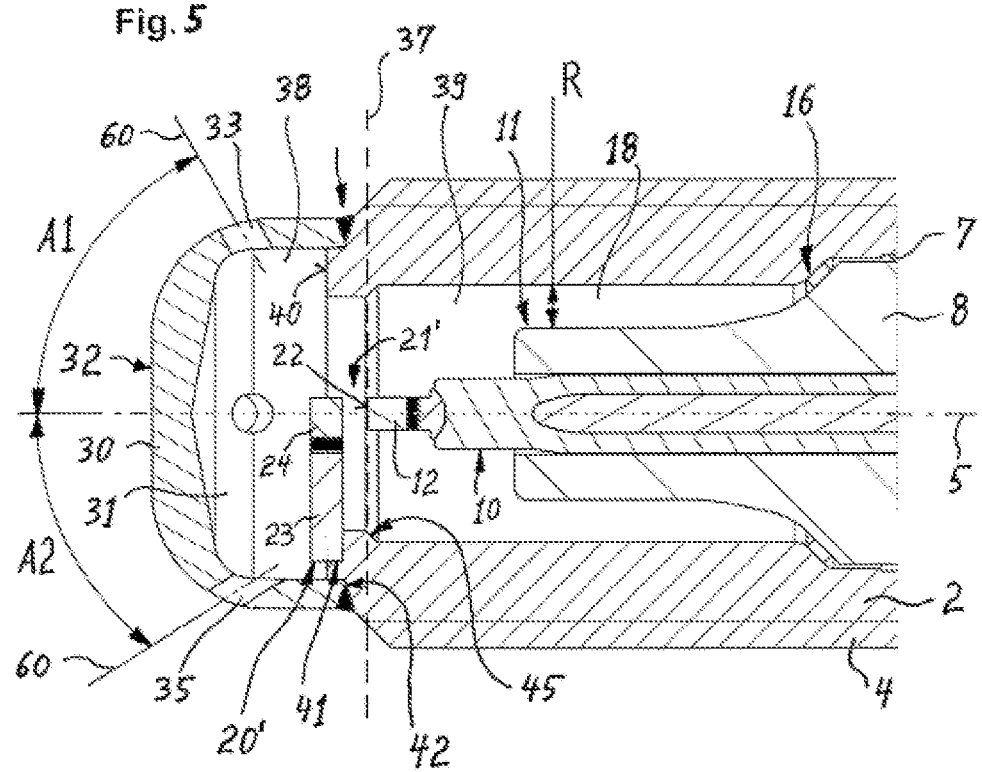

PRE-CHAMBER SPARK PLUG FOR HIGHLY STRESSED MOBILE GASOLINE-DRIVEN ENGINE APPLICATIONS

REFERENCE TO RELATED APPLICATIONS

This application claims the benefit of German Application No. 10 2017 107 679.4, filed on Apr. 10, 2017, the contents of which are hereby incorporated by reference in their entirety.

FIELD

The present invention is generally related to pre-chamber spark plugs for combustion engines, such as highly stressed mobile gasoline-driven engine applications.

BACKGROUND

Pre-chamber spark plugs are known from DE 101 44 976 A1 and U.S. Pat. No. 8,912,716 B2. In the pre-chamber spark plug disclosed in U.S. Pat. No. 8,912,716 B2, a ground electrode is welded to an inner circumference wall of a passage in the spark plug body. The ground electrode has a rectangular cross-section; on one of the side surfaces, a reinforcing component is provided, which forms a spark gap with an end surface of a center electrode. DE 101 44 976 A1 discloses a pre-chamber spark plug with a plurality of ground electrodes, which are embodied in the form of pins made of a thin precious metal and can be composed of a round or square wire. The two ground electrodes each form a respective spark gap with a circumference surface of a center electrode and are welded to an end surface of the body extending transversely to the center line.

SUMMARY

An object underlying the present design is to improve a pre-chamber spark plug of the type mentioned above.

This object may be attained by a pre-chamber spark plug with the features of claim 1. Advantageous modifications are the subject of the dependent claims.

The pre-chamber spark plug according to the present design may have a body with an external thread on its front end for screwing the pre-chamber spark plug into the internal combustion engine. The body has a passage in which an insulator is fastened and a center electrode protrudes from the front end of this insulator. The front end of the insulator is also referred to as the "insulator foot." The insulator can surround an internal conductor that is connected to the center electrode in an electrically conductive fashion. The back end of the pre-chamber spark plug or of the body is oriented away from the front end. The insulator can protrude out from the body there. The pre-chamber spark plug includes at least one ground electrode. The ground electrode extends in a straight line and is connected to the body in an electrically conductive fashion. The ground electrode forms a spark gap with the center electrode. At the front end of the body, a pre-chamber-forming cap is provided, which delimits a pre-chamber and shields the center electrode and the ground electrode from a combustion chamber of the internal combustion engine after the pre-chamber spark plug has been installed in the internal combustion engine. The center electrode and the ground electrode are positioned inside the pre-chamber. The cap has at least one opening, which permits a gas exchange between the pre-chamber and the space outside the pre-chamber, namely the combustion chamber of the internal combustion engine. It can be a passive pre-chamber spark plug in which the pre-chamber is supplied with fuel exclusively from the combustion chamber of the internal combustion engine, namely via the at least one opening in the cap. In particular, the passive pre-chamber spark plug does not contain any fuel supply conduits that supply additional fuel directly to the pre-chamber.

The ground electrode may be composed of multiple parts and includes a reinforcing component and a supporting component. The supporting component can be composed of a heat-resistant alloy, in particular a nickel-based alloy. The material used for the body is particularly suitable for this purpose. The reinforcing component can be made of a precious metal material, in particular a material from the platinum group or a base alloy composed of such a material. In particular, platinum and/or iridium and alloys based on these materials are suitable for this purpose. The circumference surface of the reinforcing component delimits the spark gap. The reinforcing component is welded to the end surface of the supporting component. With regard to their shape and size, the supporting component and the reinforcing component can have the same cross-section. The wire cross-section can be round or polygonal, in particular rectangular. At the front end, the body can have an end surface that extends transversely to the center line of the external thread. The supporting component can be welded to the end surface of the body.

Alternatively, the body can have a step formed on it, which extends transversely to the center line of the external thread and to which the supporting component is welded. The ground electrode extends transversely, in particular perpendicularly, to the center line of the external thread.

The pre-chamber spark plug may only have one ground electrode, in which case it forms the spark gap with an end surface of the center electrode. Alternatively, the pre-chamber spark plug can also have two or more ground electrodes, each of which forms a spark gap with a circumference surface of the center electrode.

An advantage of known spark plugs is retained in that the sparking—viewed along the center line—occurs as centrally in the pre-chamber as possible so that the sparks are spaced the greatest possible distance away from the wall. The growth of the flame is not hindered by the walls.

The amount of precious metal used in the production of the ground electrode can be reduced.

Both the supporting component and the reinforcing component can be produced in a very simple way from rod-shaped or wire-shaped semi-finished products. The welding of the reinforcing component to the end surface of the supporting component is very simple. The joining site can be accessed very easily for welding the parts, for example by means of a laser beam.

The pre-chamber spark plug according to the present design can be embodied as relatively small and is, thus, particularly suitable for use in the automotive field. The external thread may be smaller than M18 and, in particular, can be M12. M10 or M14 are also suitable, however.

In gasoline-powered spark-ignition engines, the spark plug according to the present design can improve lean-burn operation and enable a reliable, large-volume ignition in the combustion chamber by means of ignition torches or flame jets that shoot out from the openings in the cap, in particular even when the exhaust recirculation rate is relatively high.

The spark plug according to the present design has a long service life and can be used with conventional coil ignitions.

In another embodiment, the end surface of the body extending transversely to the center line or the step formed on it can contain a groove into which the supporting component of the ground electrode is inserted. The supporting component and/or the reinforcing component can be embodied in the form of a circular cylinder; the diameter can be 1.5 mm or less. A diameter of 0.5 mm to 1.2 mm, in particular 0.6 mm to 0.8 mm, is suitable. The groove can be matched to the cross-section of the supporting component. The volume of the pre-chamber can be at most 1 cm³, in particular from 0.3 cm³ to 0.6 cm³. Measured in the vicinity of the spark gap, the electrode spacing can lie in the range from 0.3 mm to 1 mm, in particular from 0.7 mm to 0.9 mm. The front end of the body can have a step extending in a circumference direction, which faces radially outward. The cap can be placed onto this step and in particular, can be welded to the body there. The opening in the cap has a center line, which can intersect with the center line of the external thread. This can produce an essentially swirl-free, high-turbulence flow in the pre-chamber, thus making it possible to ensure a good flushing of the pre-chamber and a reliable ignition. The high turbulence or high "turbulent kinetic energy" also ensures an acceleration of the combustion. The angle between the center line of the opening and the center line of the external thread can be from 30° to 80°, in particular from 45° to 60°.

In the body, an annular seat surface for the insulator can be provided at which the passage narrows, viewed from the back end to the front end. The front end of the insulator, i.e. the insulator foot, protrudes forward beyond the seat surface into the pre-chamber and is spaced apart from the body by a spacing distance of at least 1.2 mm extending in the circumference direction. The spacing distance between the front end of the insulator and the pre-chamber wall can in particular be 1.4 mm or more. When viewed from the back to the front, the passage can narrow at a point situated between the annular seat surface for the insulator and the fastening point of the ground electrode. The constriction situated between the annular seat surface for the insulator and the ground electrode, in particular the fastening point of the ground electrode on the body, can enable an improved fastening of the ground electrode. The ground electrode can contact the body along more of its length. It is thus possible to lengthen the weld between the ground electrode and the body. The constriction can in particular protrude into the pre-chamber "like a balcony" behind the ground electrode. The passage can have its smallest free cross-section at the constriction that supports the ground electrode. The passage of the body can thus narrow at two points; it is also possible for the passage to widen between the two constrictions. The passage—viewed from the back to the front—can widen at a point situated between the annular seat surface for the insulator and the front end of the insulator, i.e. in the vicinity of the insulator foot. In the vicinity of the insulator foot, an open annular space can be produced, which is large enough to ensure a good flushing of the pre-chamber.

In another embodiment, the pre-chamber can be divided by an imaginary dividing plane into a front part and a back part. The dividing plane extends perpendicular to the center line of the external thread and is positioned at an end surface of the center electrode that protrudes out from the insulator. The front part of the pre-chamber is situated on the side of the dividing plane oriented toward the front end of the spark plug and the back part of the pre-chamber is situated on the side of the dividing plane oriented toward the back end of the spark plug. The back part of the pre-chamber is situated inside the spark plug, in particular inside the body. Since the dividing plane only conceptually divides the pre-chamber into two parts, they remain connected to each other at the dividing plane. Apart from this connection of the back part of the pre-chamber to the front part of the pre-chamber at the dividing plane, the back part of the pre-chamber is closed in a gastight fashion. "Gastight" means that aside from the gas exchange with the front part of the pre-chamber taking place at the dividing plane, no gases can escape from the back part of the pre-chamber during operation. The volume of the back part of the pre-chamber is greater than the volume of the front part of the pre-chamber. The volume of the back part of the pre-chamber can be greater than the volume of the front part of the pre-chamber by a factor of 1.5 to 2.0, in particular by a factor of 1.6 to 1.7. This can achieve an enlarged space downstream of the spark gap into which residual gases from the previous power stroke of the engine can be displaced during a compression stroke. Thanks to this enlarged storage space for residual gases, a practically undiluted fresh fuel/air mixture can be present at the ignition gap between the center electrode and the ground electrode, thus enabling improved ignition by the sparks.

DRAWINGS

Figure 2:
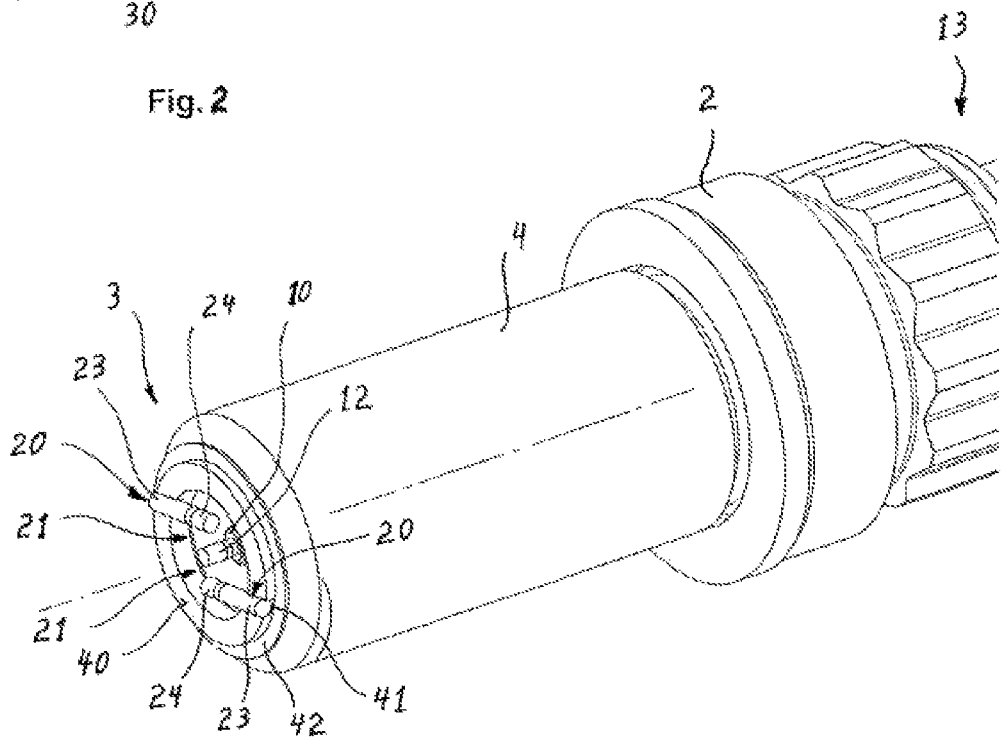
Figure 3:
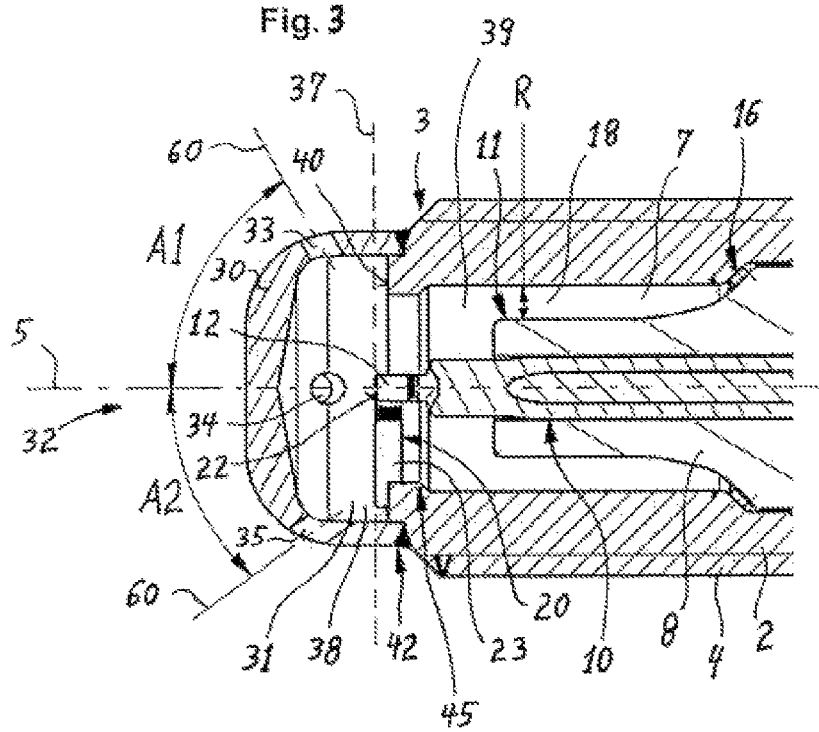
Figure 4:
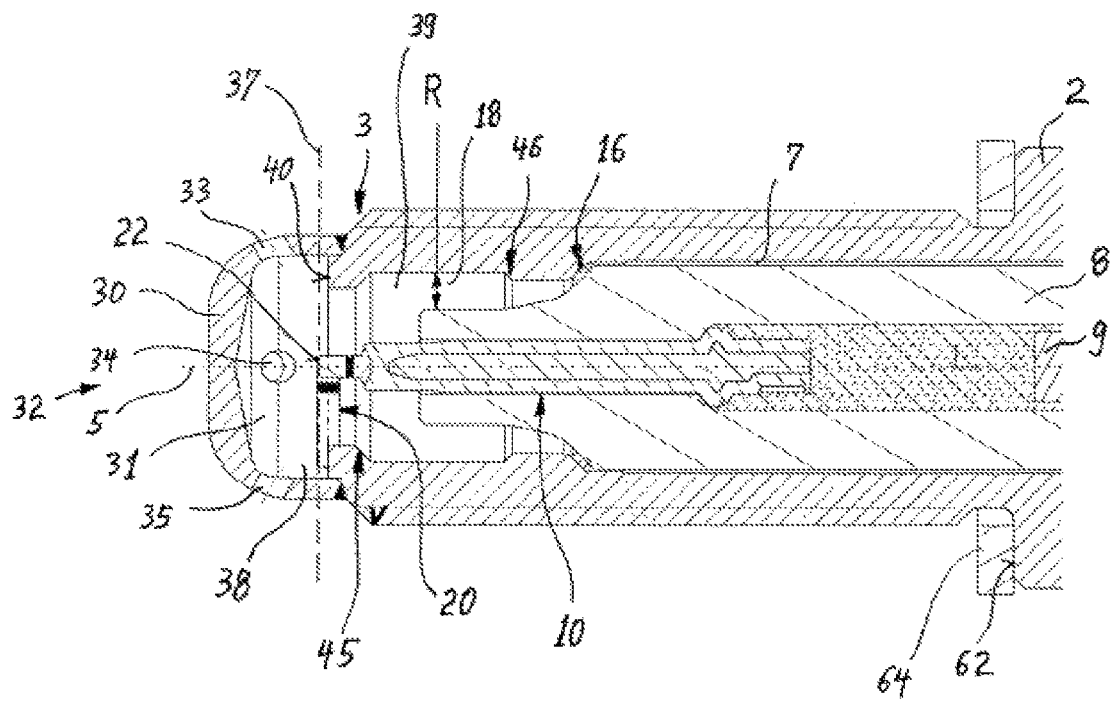

Other advantages and features of the present design ensue from the following description of some exemplary embodiments in connection with the figures. In the drawings:

FIG. 1 is a perspective view of a pre-chamber spark plug according to the present design, FIG. 2 shows the region of the front end of the pre-chamber spark plug from FIG. 1 with the cap removed, FIG. 3 shows an enlarged longitudinal section through the region of the front end of the pre-chamber spark plug from FIG. 1, FIG. 4 shows a view similar to FIG. 3 of a variant of the pre-chamber spark plug, and FIG. 5 shows a view similar to FIG. 3 of another variant of the pre-chamber spark plug.

DESCRIPTION

FIGS. 1 through 5 show a pre-chamber spark plug 1 with a metallic body 2 and an external thread 4 situated at its front end 3. The external thread 4 has a center line 5 and begins with a thread start 6 at the front end 3. The external thread 4 can be an M12 thread. The beginning of a thread turn of the external thread 4 schematically depicted in FIGS. 1 and 2 is referred to as a thread start 6. The body 2 has a passage 7 in which an insulator 8 is fastened in an intrinsically known way. The insulator 8 encloses an internal conductor 9, which is connected to a center electrode 10. At the front end 11 of the insulator 8, the center electrode 10 protrudes out from it and is provided with a reinforcing component 12 there. At the back end 13 of the pre-chamber spark plug 1, the insulator 8 protrudes out from the body 2. The body 2 is provided with a hexagonal or bihex fitting 14 to permit it to be engaged by a screwing tool. An annular seat surface 16 for the insulator 8 is provided in the passage 7.

Viewed from the back end 13 to the front end 3, the passage 7 narrows at the annular seat surface 16. A sealing ring is positioned between the seat surface 16 and a matching annular shoulder of the insulator 8. The front end 11 of the insulator 8 is embodied as an insulator foot and protrudes beyond the seat surface 16 in the direction of the front end 3 of the body. At least at the front end 11, the insulator foot is spaced apart from the inner wall of the passage 7 by a spacing distance R of approximately 1.4 mm extending in the circumference direction. The front end 11 of the insulator 8 is thus surrounded by an annular gap 18 with a width R, which can receive residual gases during a compression stroke.

The pre-chamber spark plug 1 according to FIGS. 1 through 3 and the variant shown in FIG. 4 has two ground electrodes 20 extending in a straight line, each forming a respective spark gap 21 with the circumference surface of the center electrode 10. In the variant shown in FIG. 5, only one ground electrode 20' is provided, which forms a spark gap 21' with the end surface 22 of the center electrode 10. Each of the ground electrodes 20, 20' is embodied of two parts, a supporting component 23 and a reinforcing component 24, and extends transversely to the center line 5, in particular perpendicular to it. The reinforcing component 24 is composed of a precious metal alloy, in particular a platinum and/or iridium alloy. The supporting component 23 is composed of a nickel-based alloy. The supporting component 23 and reinforcing component 24 are each embodied in the form of a circular cylinder and are made out of a wire. Their diameter can be between 0.5 mm and 1.2 mm. The reinforcing component 24 may be welded to the end surface of the supporting component 23, in particular by means of laser welding. The spark gap 21 or 21' is delimited by the circumference surface of the reinforcing component 24. The distance between the reinforcing component 24 and the reinforcing component 12 there can total 0.7 mm to 0.9 mm, for example. The ground electrodes 20 can therefore be produced very simply, making it possible to reduce the consumption of valuable precious metal. The ground electrodes 20 can be pre-fabricated in large quantities and then used in different variants of pre-chamber spark plugs 1; see in particular FIGS. 3 through 5.

At the front end 3, the body 2 has a cap 30 welded to it, which delimits a pre-chamber 31 and shields the electrodes 10, 20 and the spark gap 21. The cap 30 protrudes beyond the front end 3 of the body 2 and delimits the front end 32 of the pre-chamber spark plug 1. The cap 30 has a plurality of openings 33, 34 and 35, which extend obliquely to the center line 5 and permit a gas exchange between the pre-chamber 31 and the space outside of the pre-chamber 31. The diameter of the circular openings 33, 34, 35 can be between 0.8 mm and 1.4 mm, for example. An imaginary dividing plane, which extends perpendicular to the center line 5 and is indicated by the dashed line 37 in FIGS. 3 through 5, can be situated at the front end surface 22 of the center electrode 10. The dividing plane 37 divides the pre-chamber 31 into a front part 38 and a back part 39. The front part 38 is situated on the side of the dividing plane 37 oriented toward the front end 32 of the pre-chamber spark plug 1, and the back part 39 of the pre-chamber 31 is situated on the side of the dividing plane 37 oriented toward the back end 13. The back part 39 is situated entirely inside the pre-chamber spark plug 1. The front part 38 and the back part 39 are connected to each other at the dividing plane 37 so that a gas exchange between the front part 38 and the back part 39 can take place via the dividing plane 37. Apart from this connection to the front part 38, the back part 39 is closed in a gastight fashion. All of the openings 33, 34, 35 extend into the front part 38. In the region of the openings 33, 34 and 35, the front volume Vv extends until the outer surface of the cap 30, so that the front volume Vv also comprises the volumes of the openings 33, 34, 35 inside the wall of the cap 30. The volume Vh of the back part 39 is greater than the volume Vv of the front part 38, in particular by a factor of between 1.6 to 1.7, for example.

At the front end 3, the body 2 has an end surface 40 on which a fastening point of the ground electrode 20 is provided. For each ground electrode 20, a groove 41 is provided in the end surface 40 at the fastening point; the supporting component 23 sits in this groove 41 and is welded to the body 2, in particular by means of resistance welding. In an embodiment that is not shown, the ground electrode 20 can also be welded to the end surface 40 without a groove 41. At the front end 3, the body 2 has a step 42 extending in the circumference direction, which faces radially outward. The cap 30 is placed onto this step 42 and is welded to the body 2 there. Alternatively, in an embodiment that is not shown, instead of an external step 42, the front end 3 can have an internal step formed into it, which extends transversely to the center line 5 and to which the supporting component 23 is welded. In this alternative, the cap 30 is welded to the end surface 40 of the body 2. Depending on the embodiment, the end surface 40 and/or the ground electrode 20 can be positioned in the back part 39 of the pre-chamber 31; see FIGS. 3 and 4 or, in the front part 38, see FIG. 5.

Viewed from the back end 13 to the front end 3, the passage 7 of the body 2 narrows at a point 45. The constriction 45 is situated between the seat surface 16 and the ground electrode 20. At the constriction 45, the body 2 protrudes like a balcony into the pre-chamber 31. This improves the fastening of the ground electrode 20. As shown in FIG. 4, when viewed from back to front, the passage 7 can widen at a point 46, which is situated between the constriction formed by the seat surface 16 and the constriction 45. The annular seat surface 16 can thus widen out so that the insulator 8 can be better supported on the body 2. The widening 46 can also increase the width R of the annular gap 18. This can be advantageous for permitting better flushing of residual gases out of the annular gap 18 and for achieving a correspondingly large volume Vh of the back part 39 of the pre-chamber 31, which offers enough space in the back part to accommodate any residual gases still remaining.

In an intrinsically known way, the cap 30 shields the center electrode 10 and the ground electrode 20 from a combustion chamber, not shown, of an internal combustion engine. The openings 33, 34 and 35 permit a gas exchange between the combustion chamber and the pre-chamber 31. During the compression stroke, fresh fuel/air mixture is pushed from the combustion chamber through the openings 33, 34 and 35 into the pre-chamber 31. Residual gases remaining in the pre-chamber 31 are displaced into the back part 39 so that fresh mixture travels to the spark gap 21. Each of the openings 33, 34 and 35 has a center line 60, which extends along the direction in which the openings 33, 34 and 35 extend and intersects with the wall of the cap 30. The center lines 60 of the openings 33, 34 and 35 each intersect with the center line 5 of the external thread 4. The center line 60 of the opening 33 is oriented at an angle A1 relative to the center line 5, and the center line 60 of the opening 35 is oriented at an angle A2 relative to the center line 5. The angles A1 and A2 are different and can be from 45° to 60°. The center lines of all of the openings in the cap 30 intersect with the center line 5 of the external thread 4 in order to enable a swirl-free flow of the fresh fuel/air mixture into the pre-chamber 31.

Adjacent to the external thread 4 at the rear end 13 thereof, the body 2 has a collar with an external sealing seat 62, which limits how far the pre-chamber spark plug 1 can be screwed into the internal combustion engine. The external sealing seat 62 is associated with a sealing ring 64 for sealing the combustion chamber.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

| | |
|---|---|
| 1 | pre-chamber spark plug |
| 2 | body |
| 3 | front end |
| 4 | external thread |
| 5 | center line |
| 6 | thread start |
| 7 | passage |
| 8 | insulator |
| 9 | internal conductor |
| 10 | center electrode |
| 11 | front end |
| 12 | reinforcing component |
| 13 | back end |
| 14 | bihex fitting |
| 16 | seat surface |
| 18 | annular gap |
| 20, 20' | ground electrode |
| 21, 21' | spark gap |
| 22 | end surface |
| 23 | supporting component |
| 24 | reinforcing component |
| 30 | cap |
| 31 | pre-chamber |
| 32 | front end |
| 33 | opening |
| 34 | opening |
| 35 | opening |
| 37 | dividing plane |
| 38 | front part |
| 39 | back part |
| 40 | end surface |
| 41 | groove |
| 42 | step |
| 45 | constriction |
| 46 | widening |
| 60 | center line |
| 62 | external sealing seat |
| 64 | sealing ring |
| A1, A2 | angle |
| R | spacing distance |
| Vh | back volume |
| Vv | front volume |

The invention claimed is:

1. A pre-chamber spark plug for an internal combustion engine, comprising:
   a body with an external thread at its front end for screwing the pre-chamber spark plug into the internal combustion engine;
   the body has a passage in which an insulator is fastened and a center electrode protrudes from the front end of the insulator;
   at least one ground electrode extending in a straight line is connected to the body in an electrically conductive fashion and forms a spark gap with the center electrode;
   at the front end of the body, a pre-chamber-forming cap is provided, which delimits a pre-chamber and shields the center electrode and the ground electrode from a combustion chamber of the internal combustion engine after the pre-chamber spark plug has been installed in the internal combustion engine;
   the cap has at least one opening, which permits a gas exchange between the pre-chamber and the space outside the pre-chamber;
   wherein the ground electrode is comprised of multiple parts and includes a cylindrically-shaped reinforcing component having a rounded outer surface and a cylindrically-shaped supporting component having a rounded outer surface, the reinforcing component is welded to an end surface of the supporting component, the rounded outer surface of the supporting component is either welded to an end surface of the body extending transversely to the center line of the external thread or is welded to a step that is formed on the end surface of the body such that a cylindrically-shaped ground electrode extends from the body toward the center electrode, and the supporting component and/or the reinforcing component is embodied in the form of a circular cylinder.

2. The pre-chamber spark plug according to claim 1, wherein the end surface of the body extending transversely to the center line or the step formed on the end surface contains a groove into which the ground electrode is inserted.

3. The pre-chamber spark plug according to claim 1, wherein the diameter of the supporting component and/or the reinforcing component is less than or equal to 1.5 mm.

4. The pre-chamber spark plug according to claim 1, wherein the front end of the body has a step extending in a circumference direction, which faces radially outward, and the cap is placed onto this step.

5. The pre-chamber spark plug according to claim 1, further comprising:
   an annular seat surface for the insulator is provided in the passage of the body;
   the passage narrows at the seat surface, viewed from the back end to the front end.

6. The pre-chamber spark plug according to claim 5, wherein the front end of the insulator protrudes forward beyond the seat surface into the pre-chamber and is spaced apart from the body by a spacing distance (R) of at least 1.2 mm extending in the circumference direction.

7. The pre-chamber spark plug according to claim 5, wherein the passage, when viewed from the back to the front, narrows at a point situated between the annular seat surface for the insulator and the ground electrode.

8. The pre-chamber spark plug according to claim 5, in which the passage, when viewed from the back to the front, widens at a point situated between the annular seat surface for the insulator and the front end of the insulator.

9. A pre-chamber spark plug for an internal combustion engine, comprising:
   a body with an external thread at its front end for screwing the pre-chamber spark plug into the internal combustion engine;

the body has a passage in which an insulator is fastened and a center electrode protrudes from the front end of the insulator;

at least one ground electrode extending in a straight line is connected to the body in an electrically conductive fashion and forms a spark gap with the center electrode;

at the front end of the body, a pre-chamber-forming cap is provided, which delimits a pre-chamber and shields the center electrode and the ground electrode from a combustion chamber of the internal combustion engine after the pre-chamber spark plug has been installed in the internal combustion engine;

the cap has at least one opening, which permits a gas exchange between the pre-chamber and the space outside the pre-chamber;

wherein the ground electrode is comprised of multiple parts and includes a reinforcing component and a supporting component, the reinforcing component is welded to the end surface of the supporting component, and the supporting component is either welded to an end surface of the body extending transversely to the center line of the external thread or is welded to a step that is formed on the end surface of the body, and wherein:

the pre-chamber is divided into a front part and a back part by an imaginary dividing plane which extends perpendicular to the center line of the external thread at the end surface of the center electrode that protrudes out from the insulator;

the front part of the pre-chamber is situated on the side of the dividing plane oriented toward the front end of the pre-chamber spark plug;

the back part of the pre-chamber is situated on the side of the dividing plane oriented toward the back end of the pre-chamber spark plug, the back part of the pre-chamber is situated inside the pre-chamber spark plug, and apart from a connection to the front part of the pre-chamber at the dividing plane, the back part of the pre-chamber is closed in a gastight fashion; and the volume (Vh) of the back part of the pre-chamber is greater than the volume (Vv) of the front part of the pre-chamber.

10. The pre-chamber spark plug according to claim 1, wherein the spark plug has only one ground electrode which forms the spark gap with an end surface of the center electrode.

11. The pre-chamber spark plug according to claim 1, wherein the spark plug has two or more ground electrodes, each of which forms a spark gap with a circumference surface of the center electrode.

12. A spark plug for an internal combustion engine, comprising:

a body with an external thread at its front end for screwing the spark plug into the internal combustion engine;

an insulator fastened in a passage of the body;

a center electrode that protrudes from a front end of the insulator, wherein the center electrode has an end surface and a circumference surface;

a first ground electrode extending in a straight line that is connected to the body in an electrically conductive fashion and forms a first spark gap with the center electrode; and a second ground electrode extending in a straight line that is connected to the body in an electrically conductive fashion and forms a second spark gap with the center electrode, wherein the first ground electrode and the second ground electrode are each comprised of multiple parts, including a reinforcing component and a supporting component, the reinforcing component including a side surface between two end surfaces, with one end surface of the reinforcing component being welded to an end surface of the supporting component, and the supporting component is either welded to an end surface of the body extending transversely to the center line of the external thread or is welded to a step that is formed on the end surface, and wherein each of the first spark gap and the second spark gap is formed between the side surface of the reinforcing component and the circumference surface of the center electrode.

* * * * *

UNITED STATES PATENT AND TRADEMARK OFFICE
CERTIFICATE OF CORRECTION

PATENT NO.         : 10,886,710 B2
APPLICATION NO.    : 15/926559
DATED              : January 5, 2021
INVENTOR(S)        : Werner Niessner et al.

Page 1 of 1

It is certified that error appears in the above-identified patent and that said Letters Patent is hereby corrected as shown below:

On the Title Page (54), In the Title:
Please replace the title with the following:
SPARK PLUG FOR INTERNAL COMBUSTION ENGINE Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*